Jan. 24, 1967     T. C. PAUL ET AL     3,300,025
CONVEYORS
Filed Oct. 22, 1965     2 Sheets-Sheet 1
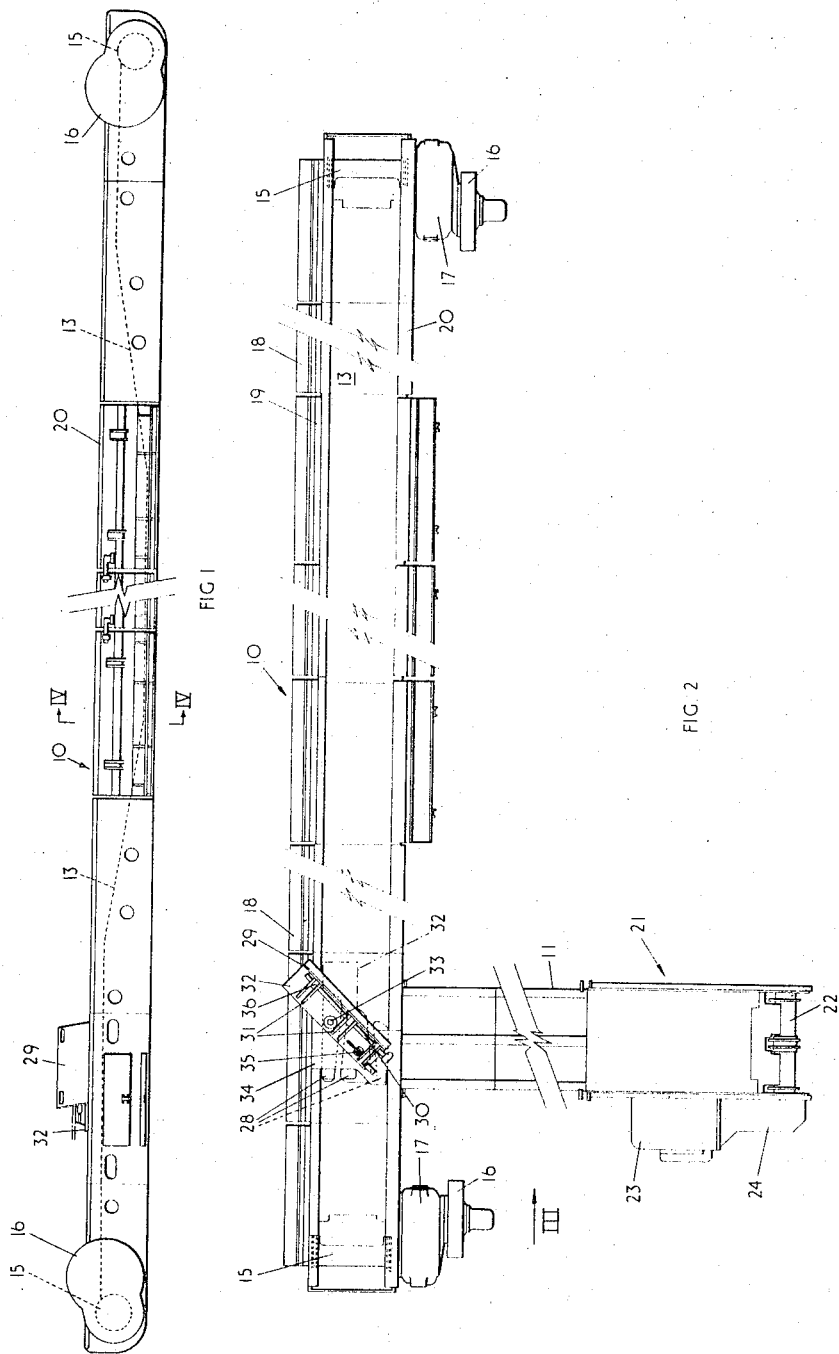
INVENTORS
THOMAS C. PAUL
DAVID EDWARDS
GORDON B. DAWSON
Stevens, Davis, Miller & Mosher
ATTORNEYS Jan. 24, 1967  T. C. PAUL ETAL  3,300,025
CONVEYORS
Filed Oct. 22, 1965  2 Sheets-Sheet 2
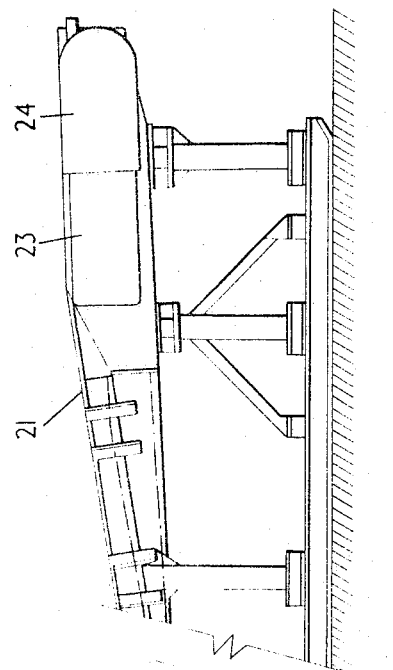
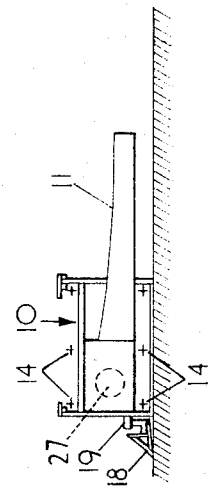
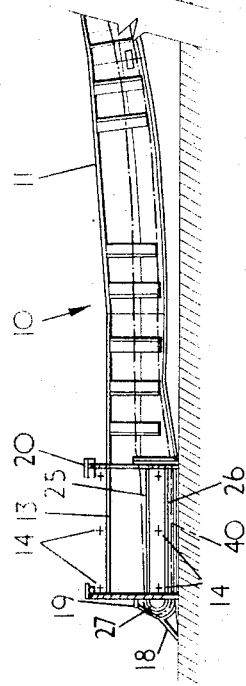
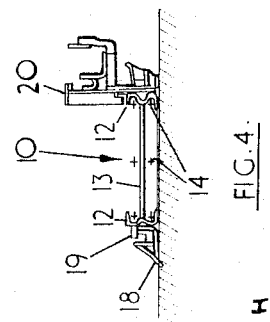
INVENTORS
THOMAS C. PAUL
DAVID EDWARDS
GORDON B. DAWSON
Stevens, Davis, Miller & Mosher
ATTORNEYS United States Patent Office 3,300,025
Patented Jan. 24, 1967

3,300,025
CONVEYORS
Thomas C. Paul, David Edwards, and Gordon B. Dawson, all of Worcester, England, assignors to Coal Industry (Patents) Limited, London, England, a company of Great Britain
Filed Oct. 22, 1965, Ser. No. 501,235
Claims priority, application Great Britain, Oct. 29, 1964, 44,074/64
4 Claims. (Cl. 198—102)

This invention relates to an improved conveyor assembly for removing mineral, in particular coal mined from a longwall face.

One common assembly for this purpose is for a conveyor running the length of the face to deliver onto a stage loader which is a short elevating conveyor serving as the link between the conveyor on the face and the main conveyor in the roadway which serves the face. The double or triple strand chain-scraper type of armoured conveyor is now almost universal for the face conveyor and stage loader.

In general the discharge end of the face conveyor is elevated sufficiently to allow the receiving end of the stage loader to be suitably located thereunder. The conveyor slopes down from the discharge height to the standard height of 5" or 7". Consequently, the travel of the coal getting machine is limited to that length of the face conveyor which is of standard height and coal opposite the driving unit and the sloping part of the conveyor is won by hand.

As the efficiency of machines increases so the hand got sections become a greater burden and a machine is ideal which could mine the hand got sections if a suitable arrangement could be made at the discharge area to allow the machine to travel onto the drive unit at that point.

According to the present invention a conveyor assembly for removing cut mineral from a longwall face, including a scraper chain face conveyor and a stage loader extending transverse to said face conveyor, which is arranged to deliver onto a receiving section of said stage loader, and which has an upper conveying strand supported by a deck plate, a lower return strand below the deck plate and, at least at one end, a drive section for driving the conveyor chains, said face conveyor has secured to each side a longitudinally extending slideway arranged to slidably engage and support a corresponding slide on a mining machine operable along and above the said face conveyor, each slideway extending from one extreme end of the face conveyor to the other including the drive unit and arranged throughout its whole length to support the mining machine at a constant height above the face conveyor, and the receiving section of the stage loader is located between the load carrying and return strands of the face conveyor, the deck plate of the latter being apertured immediately above the said receiving section to define a discharge opening for the transfer of mineral from the face conveyor onto the stage loader.

The fact that the face conveyor supports the machine at the same height throughout means that there will be a limitation on the machine in respect of the minimum coal thickness in which it can operate as compared with a machine supported on the 5" or 7" normal run of conveyors. However, the insertion of the receiving section of the stage loader between the strands of the face conveyor so reduces height at the discharge point, and therefore the height at which the machine is supported throughout, as to make this limitation acceptable. In addition to the reduction in overall height resulting from the insertion of the said receiving section between the upper and lower strands of the face conveyor, this advantageous arrangement allows the receiving section to be accommodated wholly within the height of the face conveyor with no part projecting below the floor level of the latter conveyor, thus rendering unnecessary any excavation of the underlying mine floor to accommodate advance of the stage loader.

Both strands of the stage loader may pass between the strands of the face conveyor. Alternatively, the carrying and return strands of the stage loader could pass above and below the return strand of the face conveyor with the terminal means placed outside the side plate of the face conveyor drive framework. This latter arrangement is particularly advantageous since the terminal means for effecting reversal of the conveyor chains are located towards floor level and thus out of the path of any projecting parts of a mining machine movable along the face conveyor, and the terminal means are at the same time spaced from the zone immediately beneath the discharge opening and in consequence do not interfere with the transfer of mineral from one conveyor to the other. The opening in the deck plate of the face conveyor is preferably shaped so as to distribute coal across the width of the stage loader.

The size of the discharge opening in the deck plate will of necessity be limited by the width of the face conveying deck plate and the width of the stage loader, and may be insufficient to receive the larger pieces of mineral produced by a mining machine, such pieces tending to bridge across the discharge opening. To ensure the transfer onto the stage loader of such relatively larger mineral pieces, a removable deflector plate is advantageously mounted on the face conveyor immediately above the discharge opening, the deflector plate extending obliquely across the face conveyor to deflect the larger lumps laterally over the side of the face conveyor onto the stage loader.

The stage loader built into the face conveyor drive unit framework could be used to serve as an anchoring beam, a function usually performed by a separate beam.

A further advantage of the invention is that the position of the stage loader relative to the end of the face can be varied to suit conditions. When using an orthodox discharge over the end of the face conveyor, the stage loader is necessarily placed at the end of the face, a position which gives rise to difficulties connected with roof supports.

By way of example only, a specific embodiment of the present invention will be hereinafter described with reference to the accompanying drawings in which:

FIG. 1 shows a face conveyor and its discharge assembly constructed in accordance with the present invention, the face conveyor being viewed from its goaf side;

FIG. 2, a plan view of the conveyor assembly;

FIG. 3, a view in the direction of arrow III in FIG. 2;

FIG. 4, a vertical section on the line IV—IV in FIG. 1, and

FIGS. 5 and 6, sectional views of two alternate discharge arrangements.

Referring to FIGS. 1–4 of the drawings, the illustrated conveyor assembly for a longwall coalface comprises a face conveyor 10 which in use extending parallel to the coalface, and a stage loader 11 which extends at right angles to the face conveyor 10 to link the latter to a main conveyor (not shown) in the mine roadway which serves the face. For reasons of clarity, the stage loader is omitted from FIG. 1.

The face conveyor 10 is of the conventional double or treble strand scraper chain type having sigma-shaped side members 12 (FIG. 4) inter-connected by a conveying deck plate 13 along which the coal is conveyed by transverse flights (not shown) attached to endless round link chains, three chains 14 (FIGS. 3 and 4) being shown in the illustrative embodiment. At each end of the conveyor 10, the deck plate 13 rises to guide the chains 14 over a driven sprocket shaft 15, the shafts 15 each being mounted in a drive section of the conveyor and each being driven by a hydraulic motor 16 through a gear box 17, the motors and gear boxes being mounted on the goaf sides of the drive sections.

Mounted along the face side of the conveyor 10 is a ramp plate assembly 18 arranged in known manner to raise loose coal onto the conveyor 10 as the latter is advanced in a direction transverse to its length to follow advance of the coalface, e.g. by pushing rams (not shown) spaced along the goaf side of the conveyor. The ramp plate assembly 18 extends along the full length of the conveyor and is associated with a first slide way 19 arranged to slidably engage and support the face-side shoes of a mining machine (not shown) which in operation is hauled to and from along the face conveyor 10. The goaf side shoes of the mining machine are similarly slidably supported upon a second slide way 20 extending above and secured to slide numbers 12 on the goaf side of the face conveyor 10.

The slide ways 19 and 20 extend along the length of the conveyor and are arranged to support the mining machine at the same height throughout including over the end drive sections (where as previously mentioned, the conveyor deck plate 13 rises), so that in consequence the mining machine has an uninterrupted path extending from one extreme end of the conveyor to the opposite extreme end.

The stage loader 11 is of a double or triple strand roller chain type in which the coal is conveyed on contiguous straps extending between and attached to the roller chains (the straps and chains are not shown in the drawing but the path of the chains is indicated in part by chain line 40 in FIG. 3), and the stage loader has an elevated rear section 21 arranged to discharge in known manner onto a gate conveyor (not shown). The roller chains of the stage loader 11 extend around and drivably engage with a drive roller 22 (FIG. 2) driven by a motor 23 and associated gear box 24 which are mounted on a side of the elevated rear section 21.

The opposite end of the stage loader 11, i.e. the receiving end, is built into the face conveyor in a section of the latter adjacent the appertaining drive section, in which the deck plate 13 has risen to its relatively higher level. The said receiving end of the stage loader includes an upper deck plate 25 (FIG. 3) which is arranged to guide the conveying strands of the roller chains and cross straps between the conveying and return strands 14 of the face conveyor 10, and a lower guide plate 26 which is interposed between the return strand of the face conveyor 10 and the return strand of the stage loader 11. The roller chains are reversed at the forward end of the stage loader 11 by terminal means in the form of a curved deflector plate 27 around which the roller chains are trained. The curved deflector plate 27 projects beyond the face side plates of face conveyor 10 and is mounted interiorly of the ramp plate assembly 18. The projection of the deflector plate 27 onto the face side of the conveyor may render it necessary to raise the guide strips 19 over the section of the conveyor. If this is the case, then in order to maintain the machine at the same vertical level an additional shoe is provided on the machine to engage the elevated slide way, the lower shoes being temporarily displaced clear of the raised slide way.

Transfer of the coal from the face conveyor 10 onto the stage loader 11 is achieved by the provision of three discharge apertures 28 (FIG. 2) formed in the deck plate 13 of the face conveyor immediately above the deck plate 25 of the receiving section of the stage loader 11. The apertures 28 are arranged side by side across the face conveyor deck plate and progressively increase in length in a direction longitudinally of the face conveyor, the longest aperture 28 having a length approximating to the width of the stage loader 11. This advantageous shaping of the apertures ensures an even distribution of the discharging coal across the width of the stage loader.

Material of too large a size to pass through the apertures 28 is deflected laterally over one side of the face conveyor onto the stage loader by a removable deflector or plough plate 29 extending obliquely across the face conveyor immediately above the discharge apertures 28. The plough plate 29 is releasably connected by a longitudinally slideable shank 30 to three double brackets 31 upstanding from a base plate 32. The plough plate 29, in its operative position, rests against the brackets 31, and the shank 30 is introduced into aligned holes in the brackets 31 and into lugs 36 secured to the rear face of the plough plate 29. The base plate 32 is pivotable about a vertical pivot pin 33 attached to a cross plate 34 secured between the side flanges of the face conveyor 10, a locking pin 35 is inserted into the aligned holes in the base plate and fixed cross plate, releasably retaining the base plate in its operative position as shown in the drawings. In this position the plough plate 29 projects into the path of the mining machine which is mounted for movement along the face conveyor, and thus has to be removed when it is required to traverse the mining machine over this particular section of the face conveyor.

To effect such removal, the pivot pin 30 is completely withdrawn from the holes in the upstanding brackets 31 and the lugs 36, the now released plough plate 29 removed, and the base plate 32 released by removal of the locking pin 35 and swung about the vertical pivot pin 33 into the position indicated by the chain lines 32 in FIG. 2. Conversely when the machine has moved clear of the discharge section, the base plate 32 is swung back and locked in its operative position, and the plough plate 29 once again secured in position against the upstanding brackets 31 by insertion of the shank 30.

The use of a stage loader in the form of a roller type conveyor is particularly advantageous in that the claims are able to negotiate a relatively tighter bend than the more usual round link chains at the terminal means 27, and in consequence the throat area immediately below the discharge apertures can be maximised.

FIGS. 5 and 6 show two alternative discharge arrangements in which both upper and lower strands of the stage loader pass between the strands of the face conveyor. In these figures only the discharge section of the face conveyor and immediately adjacent parts of the stage loader are shown in each case, and part similar to those already described are indicated by like reference numerals. In each case the terminal means 27 are mounted wholly within the width of the face conveyor 10 so that they do not project into the path of the mining machine. In the embodiment shown in FIG. 5, the stage loader is a roller chain type whilst that shown in FIG. 6 is of the more conventional scraper chain type in which the terminal means 27 is constituted by a return roller.

We claim:

1. A conveyor assembly for removing cut mineral from a longwall face comprising: a face conveyor of the endless scraper chain type having an upper conveying strand slidably supported upon a deck plate, a lower return strand extending below the said deck plate, and a drive section for driving the endless conveyor chains, said face conveyor having secured to each side a longitudinally extending slideway arranged to slidably engage and support a corresponding slide on a mining machine operable along and above the said face conveyor, each slideway extending from one extreme end of the face conveyor to the other including over the said drive section and each slideway being arranged throughout its whole length to support the mining machine at a constant height above the said face conveyor; and a stage loader extending transverse to said face conveyor and having a receiving section arranged to receive debris discharged from said face conveyor, said stage loader being of an endless conveyor type and having an upper conveying strand and a lower return strand extending beneath the conveying strand, the said receiving section being located intermediate the ends of the said face conveyor and beneath the deck plate of the face conveyor, the said deck plate being apertured immediately above the said receiving section to define a discharge opening for the transfer of mineral from the face conveyor onto the stage loader, said receiving section including guide means arranged to train the conveying and return strands of the said stage loader respectively above and below the return strand of the said face conveyor and said receiving section being accommodated wholly within the height of the said face conveyor.

2. A conveyor assembly as claimed in claim 1, wherein the deck plate of the said face conveyor is apertured to define a plurality of apertures which together constitute said discharge opening, said apertures being arranged side by side across the width of the said face conveyor deck plate and progressively increasing in length in a direction longitudinally of said face conveyor to a maximum length approximating to the width of the underlying stage loader.

3. A conveyor assembly as claimed in claim 1, including a removable deflector plate mounted on said face conveyor immediately above said discharge opening and extending obliquely across said face conveyor to deflect larger lumps of mineral laterally over the side of said face conveyor onto said stage loader.

4. A conveyor assembly as claimed in claim 3, wherein said deflector plate is releasably attached to and supported by a horizontal base plate which is pivotally movable about a vertical axis from an operative position to a non-operative position clear of the path of travel of the mining machine.

References Cited by the Examiner
UNITED STATES PATENTS

| | | | |
|---|---|---|---|
| 265,020 | 9/1882 | Coker | 198—172 |
| 752,651 | 2/1904 | Camp | 198—188 |
| 1,055,591 | 3/1913 | Afzelius | 198—188 |
| 1,762,074 | 6/1930 | Paisley | 198—188 |
| 2,558,629 | 6/1951 | Smida | 198—89 |
| 3,198,308 | 8/1965 | Driesch et al. | 198—185 X |

FOREIGN PATENTS

| | | |
|---|---|---|
| 956,475 | 1/1957 | Germany. |
| 2,802 | 2/1910 | Great Britain. |
| 669,007 | 3/1952 | Great Britain. |

ANDRES H. NIELSEN, *Primary Examiner.*

EVON C. BLUNK, *Examiner.*

M. L. AJEMAN, *Assistant Examiner.*